(12) United States Patent
Konrad et al.

(10) Patent No.: US 12,359,901 B2
(45) Date of Patent: Jul. 15, 2025

(54) COORDINATE MEASURING APPARATUS

(71) Applicant: Hexagon Metrology GmbH, Wetzlar (DE)

(72) Inventors: Armin Konrad, Hüttenberg (DE); Claude Rouge, Baulmes (CH); Léonard Wunderlin, Tolochenaz (CH)

(73) Assignee: Hexagon Metrology GmbH, Wetzlar (DE)

( * ) Notice: Subject to any disclaimer, the term of this patent is extended or adjusted under 35 U.S.C. 154(b) by 348 days.

(21) Appl. No.: 18/078,412

(22) Filed: Dec. 9, 2022

(65) Prior Publication Data

US 2023/0184531 A1    Jun. 15, 2023

(30) Foreign Application Priority Data

Dec. 10, 2021    (DE) .................... 10 2021 132 660.5
Nov. 30, 2022    (EP) ..................................... 22210472

(51) Int. Cl.
    *G01B 5/008*    (2006.01)
(52) U.S. Cl.
    CPC .................................. *G01B 5/008* (2013.01)
(58) Field of Classification Search
    CPC .............................. G01B 5/008; G01B 5/012
    USPC .................................................... 33/503, 559
    See application file for complete search history.

(56) References Cited

U.S. PATENT DOCUMENTS

| | | | |
|---|---|---|---|
| 4,397,188 A * | 8/1983 | Bansevichus | G01B 7/012 33/561 |
| 4,720,922 A | 1/1988 | Strauss | |
| 4,742,621 A | 5/1988 | Mayer et al. | |
| 5,339,194 A * | 8/1994 | Yates | G02B 7/10 359/384 |
| 8,549,899 B2 * | 10/2013 | Igasaki | G01B 7/012 73/105 |
| 9,062,956 B2 * | 6/2015 | Schopf | G01B 21/047 |
| 9,103,648 B2 * | 8/2015 | Noda | G05B 19/40931 |
| 9,557,157 B2 * | 1/2017 | Ihlenfeldt | G01C 3/08 |
| 9,664,629 B2 * | 5/2017 | Sakai | G01B 5/0014 |
| 9,683,828 B2 * | 6/2017 | Pettersson | G05B 19/401 |
| 10,145,666 B2 * | 12/2018 | Jansson | G01B 5/016 |
| 10,197,375 B2 * | 2/2019 | Sakai | G01B 5/016 |

(Continued)

FOREIGN PATENT DOCUMENTS

| | | |
|---|---|---|
| CN | 106996762 A | 8/2017 |
| DE | 3532184 C1 | 2/1987 |

(Continued)

OTHER PUBLICATIONS

European Patent Office, European Search Report for Patent Application No. 22 21 0472, dated Apr. 28, 2023, 12 pages.

(Continued)

*Primary Examiner* — George B Bennett
(74) *Attorney, Agent, or Firm* — Nutter McClennen & Fish LLP

(57) ABSTRACT

The invention relates to a coordinate measuring machine with a ram and
 a probe head or
 a sensor or
 an articulating head/unit or
 with an articulating head/unit with a probe head or sensor positioned on the articulating head/unit
and/or
 with an interface
in which the probe head or the sensor or an adapter for the articulating head/unit and/or the interface is/are positioned at least partially in the ram.

20 Claims, 12 Drawing Sheets

(56) References Cited

U.S. PATENT DOCUMENTS

| | | | |
|---|---|---|---|
| 10,415,955 B2 | 9/2019 | Haverkamp | |
| 10,794,684 B2* | 10/2020 | Raho | G01B 9/02 |
| 10,907,949 B2* | 2/2021 | Singh | G01B 11/007 |
| 10,942,020 B2* | 3/2021 | Meile | G01B 5/008 |
| 11,499,817 B2* | 11/2022 | Eiles | G06T 1/0014 |
| 11,543,230 B2* | 1/2023 | Seitz | G01B 5/012 |
| 11,635,291 B2* | 4/2023 | Harsila | G01B 5/0004 |
| | | | 356/601 |
| 12,061,076 B2* | 8/2024 | Miyaki | G01B 11/002 |
| 2008/0189969 A1 | 8/2008 | Fuchs et al. | |
| 2009/0207403 A1* | 8/2009 | Nemoto | G01B 5/008 |
| | | | 356/124 |
| 2016/0305777 A1* | 10/2016 | Racine | G01B 21/00 |
| 2019/0072373 A1* | 3/2019 | Iseli | G01B 5/0004 |
| 2019/0170503 A1* | 6/2019 | Qi | G01B 11/005 |
| 2019/0293402 A1* | 9/2019 | Kiyotani | G01B 5/008 |
| 2019/0304131 A1* | 10/2019 | Gesner | G01B 11/005 |
| 2021/0116228 A1* | 4/2021 | Hamner | G01D 5/2046 |
| 2021/0172719 A1* | 6/2021 | Frank | G01B 5/008 |
| 2023/0194233 A1* | 6/2023 | Keehnel | G01D 5/2046 |
| | | | 33/503 |
| 2024/0093987 A1* | 3/2024 | Aebischer | G01B 21/045 |
| 2024/0175668 A1* | 5/2024 | Freerksen | G01B 5/012 |

FOREIGN PATENT DOCUMENTS

| | | |
|---|---|---|
| DE | 3545330 A1 | 6/1987 |
| DE | 102004010083 B4 | 11/2006 |
| DE | 102005032749 A1 | 1/2007 |
| DE | 102007054915 A1 | 5/2009 |
| DE | 102016101173 A1 | 7/2017 |
| DE | 102016124549 A1 | 6/2018 |
| DE | 102019122049 A1 | 2/2021 |
| WO | 2009/062641 A1 | 5/2009 |

OTHER PUBLICATIONS

German Patent Office, Office Action for Application No. 102021132660.5, dated Jul. 7, 2022, 6 pages.

* cited by examiner

COORDINATE MEASURING APPARATUS

RELATED APPLICATIONS

This patent application claims priority to German Patent Application No. DE 10 2021 132 660.5, filed Dec. 10, 2021, and to European Patent Application EP 22210472.1, filed Nov. 30, 2022, the content of each is herein incorporated by reference in its entirety.

DESCRIPTION

The invention relates to a coordinate measuring machine with a ram and a probe head or a sensor or an articulating head/unit or an articulating head/unit with a probe head or sensor positioned on the articulating head/unit and/or an interface. The interface is used to position and/or change a probe head or a sensor or an articulating head/unit with high positioning accuracy.

It is known from experience that tactile and non-tactile sensors positioned on a coordinate measuring machine, either fixed in place or detachable fixed, should be used for the dimensional measurement of workpieces with coordinate measuring machines.

The coordinate measuring machines known from experience consist of multiple movable axes that make it possible to move the sensor around in such a way that the geometry of workpieces can be measured.

Sensors or articulating head/units are also referred to as probe heads and probe heads are referred to as sensors or articulating head/units.

Tactile probe heads consist of a fixed part, which is permanently or detachably fixed connected to an axis of the coordinate measuring machine, usually to a ram, and a part that can move relative to the fixed part, which holds a stylus consisting of an elongated shaft and a probing element such as a ball, the probing ball, attached at one end. Other probing elements are, for example, tips or spherical discs. The other end of the stylus is attached to the movable part of the probe head, which moves relative to the fixed part when the probing element comes into contact with the surface of a workpiece. If the displacement of the stylus exceeds a predetermined value, contact with the workpiece is detected.

The measuring probe heads also have a fixed part that is permanently or detachably fixed connected to an axis of the coordinate measuring device, usually to a ram, and a part that is movable relative to the fixed part. The displacement of the movable part relative to the fixed part is continuously measured by means of suitable measuring equipment. With touch trigger probe heads, displacement is indicated simply by means of an electrical triggering pulse. Return forces act on the movable part of the probe head so that the probe head is in a defined position relative to the fixed part of the probe head when no external forces are acting on the stylus.

In addition, the prior art (DE 10 2004 010 083 B4) includes coordinate measuring machines in which the probe heads have swings that are connected to one another via spring parallelogram plates.

In order to be able to perform as many different measuring tasks as possible, tactile or measuring probe heads have a mechanical interface into which different stylus configurations can be inserted or automatically exchanged.

The prior art (DE 10 2007 054 915 A1) also includes optical sensors with which a non-contact optical measuring method can be carried out.

In order to be able to measure complex objects, such as engine blocks, with a coordinate measuring machine, it is necessary to both change the stylus configuration frequently and to change the probe head or sensor relatively frequently. The probe head or sensor is usually positioned on a ram of the coordinate measuring machine. Different probe heads or sensors for different measuring tasks can be mounted in probe head or sensor holders. These probe heads or sensors are often exchanged fully automatically by the coordinate measuring machine, depending on the measuring task requiring a specific probe head or sensor to be exchanged. However, they can also be changed manually.

When picking up articulating head/units or probe heads or sensors from a rack, i.e. a device for storing articulating head/units or probe heads or sensors or styli that are not currently needed, many movements of the coordinate measuring machine are carried out in at least two axes, such as threading a clamping hook, moving a clamping hook, and unthreading the stylus attachment from the holder.

The coordinate measuring machines known from experience, in particular the coordinate measuring machines that are built in a portal design, have a ram on which the probe head or sensor or the articulating head/unit is positioned in such a way that it can be exchanged.

Embodiments are also known from practice in which an interface is positioned on the ram. The articulating head/unit or the probe head or the sensor is positioned on the interface so that it can be exchanged.

Particularly in the case of coordinate measuring machines with a portal design that have an automated or manual probe head changing device, such as according to DE 10 2019 122 049 A1, the probe head changing device reduces the measurement height determined by the coordinate measuring machine with a portal design. The height available for the range of measurement is thus reduced by a probe head changing device.

This means that with less measuring space, users have to resort to using larger coordinate measuring machines, which in turn are more expensive and have greater measuring errors.

The technical problem on which the invention is based is to specify a coordinate measuring machine that has a probe head or a sensor or an articulating head/unit or an articulating head/unit with a probe head or sensor and/or an interface positioned on the articulating head/unit that still has a large measuring space.

This technical problem is solved by a coordinate measuring machine with the features under claim 1.

The coordinate measuring machine according to the invention with a ram and
   a probe head or
   a sensor or
   an articulating head/unit or
   with an articulating head/unit with a probe head or sensor
      positioned on the articulating head/unit
and/or
   with an interface
is characterized in that the probe head or the sensor or an adapter, i.e. for the articulating head/unit and/or the interface, is positioned at least partially in the ram.

The ram is typically tubular. Electrical lines or, for example, fiber optic cables, which must not be bent, are often positioned in the ram. However, there is sufficient space in the ram to position an interface or a probe head or a sensor or an adapter for an articulating head/unit at least partially in the ram. There is sufficient space in the ram to position an interface with a probe head or with a sensor or with an adapter for an articulating head/unit at least partially in the ram.

This design saves the measurable space available for measuring workpieces.

This embodiment of the coordinate measuring machine according to the invention increases the measuring space, so that larger workpieces can be measured.

According to the invention, the probe head or the sensor or the adapter for the articulating head/unit or the interface can be positioned at least partially in the ram.

In the case of the articulating head/unit, a part of the articulating head/unit, namely the stationary part of the articulating head/unit, is advantageously positioned at least partially in the ram. The stationary part of the articulating head/unit is called the adapter.

A probe head or a sensor is advantageously positioned on the articulating head/unit. The probe head or the sensor is advantageously positioned on the articulating head/unit so that it can be exchanged.

If an interface is provided, the probe head or the sensor or the articulating head/unit can be advantageously positioned exchangeably at least partially in the interface in a preferably reproducible bearing.

If no interface is provided, the probe head, the sensor, or the articulating head/unit can be positioned exchangeably at least partially in the ram in a preferably reproducible bearing.

If an interface is provided, it can be firmly but detachably fixed positioned at least partially in the ram. The firm, but detachable fixed connection is a connection that can be undone without being destroyed. It can be implemented by means of screws or a clamp, for example.

There is also the possibility of detachable fixed positioning the probe head, the sensor, or the articulating head/unit at least partially in the ram.

According to a further advantageous embodiment, the interface is at least partially positioned in the ram and the probe head or the sensor or the adapter for the articulating head/unit is positioned at least partially in the interface.

This embodiment has the advantage of saving a considerable amount of space. Because the probe head or the sensor or the adapter for the articulating head/unit is positioned at least partially in the interface and the interface in turn is positioned at least partially in the ram, the coordinate measuring machine's measuring volume increases significantly.

According to a further advantageous embodiment of the invention, the probe head or the sensor or the adapter for the articulating head/unit and/or the interface is positioned fully in the ram. The probe head or the sensor or the articulating head/unit can be advantageously placed in a reproducible exchangeable position on the interface.

According to another advantageous embodiment, the interface and the probe head or the interface and the sensor or the interface and the adapter for the articulating head/unit can be positioned fully in the ram.

This embodiment achieves the greatest increase in measuring space in the Z direction, i.e. in the direction of the ram's longitudinal axis.

With the coordinate measuring machine according to the invention, it is possible to "countersink" the probe head or the sensor or the adapter for the articulating head/unit or the interface at least partially into the ram.

According to a preferred embodiment of the invention, it is provided that the interface is firmly but detachably fixed positioned in the ram and the probe head or the sensor or the adapter for the articulating head/unit is placed in a reproducible exchangeable position at least partially in the interface.

The interface can be positioned, for example, in the ram or at least partially in the ram by means of a screw connection. The screw connection itself can be positioned in the ram, on the ram, or outside of the ram. According to a particularly preferred embodiment of the invention, the interface is positioned at least partially in the ram and the probe head or sensor on the interface or the adapter for the articulating head/unit is positioned at least partially in the interface and thus also at least partially in the ram.

A further embodiment is that the interface is positioned only partially in the ram or that the probe head or sensor or the adapter for the articulating head/unit is positioned only partially in the ram.

If an interface is provided on which in turn a probe head or sensor or an articulating head/unit is positioned, there is the possibility of positioning the interface fully in the ram and positioning the probe head or sensor or adapter for the articulating head/unit on the interface partially in the ram. There is also the possibility of positioning the interface and the probe head or sensor on the interface or the adapter for the articulating head/unit fully in the ram.

According to a further advantageous embodiment of the invention, it is provided that the probe head or the sensor or the articulating head/unit can be reproducible exchangeable positioned at least partially in the ram.

If no interface is provided, the probe head or sensor or the adapter for the articulating head/unit is placed reproducibly exchangeable or detachably fixed at least partially in the ram.

If an interface is provided, it can be positioned at least partially in the ram.

According to an advantageous embodiment of the invention, it is provided that the exchangeable probe head or the sensor or the articulating head/unit is reproducibly mounted on the interface, or that the exchangeable probe head or the sensor or the articulating head/unit is reproducibly mounted on the ram.

This embodiment provides that the probe head or the sensor or the adapter for the articulating head/unit are positioned in such a way as to save space, which increases the coordinate measuring machine's measuring space and at the same time, enables the probe head or the sensor or the articulating head/unit to be exchanged with high precision.

According to an advantageous embodiment of the invention, it is provided that bearings for reproducible mounting on the probe head side or on the sensor side or on the articulating head/unit side are positioned at the end of the interface or the ram. This means that the bearings at the end of the ram are easily accessible.

According to a further embodiment of the invention, it is provided that the bearings for reproducible mounting are positioned on the probe head side or sensor side or articulating head/unit side at the end of the interface or the ram and outside the interface or outside the ram or inside the interface or inside the ram.

The probe head or sensor or articulating head/unit or interface is positioned on the probe head side or sensor side or articulating head/unit side. According to the advantageous embodiment of the invention, the three-point bearing is also provided at this end.

According to a further advantageous embodiment of the invention, the bearings are positioned on the probe head or sensor side or articulating head/unit side at the end of the interface or ram and outside of the ram. This ensures good accessibility to the bearings, for example to be able to clean them easily if they are dirty.

The bearings can also be positioned in the ram on the probe head side or sensor side or articulating head/unit side at the end of the ram. This saves the greatest amount of space.

According to a preferred embodiment, the fastening device for the interface is positioned outside of the ram at the end far from bearing of the probe head or sensor or of the articulating head/unit. The fastening device can be formed by screws or be designed as a clamping device.

The fastening device for the interface, for the probe head, for the sensor, or for the articulating head/unit is advantageously positioned inside the ram at the end far from bearing of the probe head or sensor or the articulating head/unit.

The fastening device of the interface for the probe head, for the sensor, or for the articulating head/unit is advantageously positioned at least partially inside the ram at the end far from bearing of the probe head or sensor or the articulating head/unit.

According to a particularly preferred embodiment of the invention, it is provided that the bearings are designed as three-point bearings. The exchangeable probe head or the sensor or the articulating head/unit is advantageously mounted reproducible on the interface by means of a three-point bearing, or the exchangeable probe head or the sensor or the articulating head/unit is advantageously mounted reproducible on the ram by means of a three-point bearing.

Instead of the three-point bearing, another reproducible bearing can also be provided.

A bearing and a counter bearing are provided for mounting in the reproducible position. The bearing and counter bearing have interacting elements to form a reproducible connection.

This ensures that accuracy in the micrometer range is achieved.

A three-point bearing consists, for example, of three balls or ball sections that engage with V-bearings or with a plane bearing, triple bearing, and V-bearing. Instead of a V-bearing, two cylinders arranged parallel to one another can also be provided. With the three-point bearing, the balls or ball sections rest on the counter bearings with a total of six bearing points.

This reproducible, high-precision bearing means that recalibration is not necessarily needed after changing the sensor.

The bearing and the fastening device work together. This interaction of a retention force system with the precise positioning forms the reproducible bearing.

As already stated, the bearings can be designed as three-point bearings. Other embodiments of bearings are also possible.

According to a further advantageous embodiment of the invention, it is provided that a fastening device is provided for the detachable and reproducible fastening of the probe head or sensor or the articulating head/unit in the ram at the end far from bearing of the probe head or sensor or the articulating head/unit.

As already stated, the bearing is positioned on the probe head side or sensor side or articulating head/unit side at the end of the ram. The fastening device for the probe head, the sensor, or the articulating head/unit is positioned inside the ram. Viewed in the axial direction of the ram, the fastening device is positioned at a distance from the remote end of the ram on the probe head side or on the sensor side or on the articulating head/unit side. The same applies to an interface if an interface is provided. The fastening device of the interface for the probe head or the sensor or the articulating head/unit is positioned at least partially inside the ram, viewed in the axial direction of the ram at a distance from the bearing on the probe head side or sensor side or articulating head/unit side at the far end of the ram. The fastening device is positioned in the ram in the axial direction so far away from the bearing that the probe head or sensor or the articulating head/unit is positioned partially or fully in the ram.

The interface can also be positioned partially or fully in the ram. The probe head, the sensor, or the adapter for the articulating head/unit can also be positioned partially or fully in the interface.

The fastening device for the interface, the probe head, or sensor or articulating head/unit has a first element of the ram and a second element, wherein the second element is connected to the interface or the probe head or sensor or articulating head/unit, which is advantageous for a detachable connection. The first and second elements are configured to be able to connect detachably to one another.

If an interface is provided, there is also the possibility that a first element is positioned on the interface and the second element on the probe head or the sensor or the adapter for the articulating head/unit. The first and second elements are configured to be able to connect detachably to each other in order to apply a retention force.

According to an advantageous embodiment, the fastening device of the interface can be designed as a hook. It is also possible to use other fastening devices, such as magnets or electromagnets.

If a hook is provided, the probe head, the sensor, or the adapter for the articulating head/unit has a corresponding receptacle (holder) for the hook. The hook must be threaded into the holder to fasten the probe head, the sensor, or the articulating head/unit. The hook must be unthreaded again when loosening the probe head, sensor, or the articulating head/unit.

According to an advantageous embodiment of the invention, the hook is swung out to the side when opening. During fixation of the sensor, probe head, or articulating head/unit, the hook is swung out from a lateral position to a position to enable the hook to engage with a receptacle for the hook on the probe head, sensor, or articulating head/unit adapter.

The hook can be positioned in the ram for the probe head, the sensor, or the articulating head/unit. There is also the possibility that the hook is positioned in the interface for the probe head, the sensor, or the articulating head/unit.

As already explained, the fastening mechanism of the interface, which can be designed as a clamping mechanism or as a screw connection, for example, is positioned in the ram. Other connections are also possible.

According to a further advantageous embodiment of the invention, at least one sensor is provided for monitoring a closed state of the fastening device. In particular when a hook is provided, at least one sensor is used to monitor the position of the hook (open/closed). According to a particularly preferred embodiment of the invention, at least one sensor is designed as a Hall sensor.

The advantageously provided at least one sensor for monitoring the closing state of the fastening device can be positioned in the ram or in the interface. The closing state of the fastening device of the interface or the ram for the probe head or the sensor or the articulating head/unit is monitored.

According to a further advantageous embodiment of the invention, an emergency release is provided for the interface. An emergency release for the probe head or the sensor or the articulating head/unit can also be provided if no interface is provided.

According to a preferred embodiment, it is advantageously provided that a mechanism for dismantling is provided. The interface and the probe head, or the interface and the sensor, or the interface and the articulating head/unit, or the probe head or the sensor or the articulating head/unit, which are positioned at least partially in the ram, can be detached with the mechanism for dismantling the interface with the probe head or the interface with the sensor or the interface with the articulating head/unit or the probe head or the sensor or the articulating head/unit. If in the event of an error, the fastening device for the interface cannot be detached with a built-in probe head or sensor or articulating head/unit or the probe head or the sensor or the articulating head/unit, the interface as a single unit with the probe head or the sensor or the articulating head/unit or the probe head or the sensor or the articulating head/unit must be removed from the ram to check the fastening device and repair it if necessary.

For this purpose, a mechanism is provided, for example consisting of screws, so that the interface with the probe head or with the sensor or with the articulating head/unit or the probe head or the sensor or articulating head/unit can be removed from the ram with the fastening device closed.

The interface is particularly preferred to be removable together with the probe head positioned on the interface or the sensor positioned on the interface or with the articulating head/unit on the interface from the ram.

According to a further advantageous embodiment of the invention, it is provided that a light barrier for detecting the probe head or the sensor or the articulating head/unit after changing the probe head or the sensor or the articulating head/unit is provided.

According to this embodiment, the closing of the fastening device, for example the hook or the generation of force by a magnet after the correct insertion of the probe head, the sensor, or the articulating head/unit is triggered by a light barrier.

With the fastening device of the interface, a frictional connection within the ram is made possible, with the form-fitting connection being formed by the three-point support on the probe head side at the end of the ram.

According to a further advantageous embodiment of the invention, at least one additional supply connection for the probe head or the sensor or the articulating head/unit or the interface is positioned in the plane of the bearing. The bearing can advantageously be designed as a three-point bearing. The bearing plane, preferably the three-point support, is advantageously positioned outside of the ram. The electrical contacts and/or a pneumatic connection and/or a hydraulic connection and/or an optical connection can also be positioned in the plane of the bearing, preferably the three-point bearing.

A further advantageous embodiment of the invention provides that an optical interface is positioned shifted from the plane of the bearing in the axial direction of the ram in the direction of the fastening device. The bearing can advantageously be a three-point bearing. This means that the optical interface is advantageously positioned inside the ram. In principle, however, the optical interface can also be positioned in the plane of the bearing, preferably the three-point bearing.

The bearings can advantageously be positioned outside of the ram. It is also possible to position the bearings inside of the ram.

It is advantageously provided that the probe head or the sensor or the articulating head/unit is designed to be automatically or manually exchangeable in the interface.

Particularly preferred is changing the probe head or the sensor or the articulating head/unit is done automatically in the interface or on the ram.

However, it is also possible to change manually.

An automated exchange has the advantage that measurement processes can be run through fully automatically and the required probe head or sensor or articulating head/unit can be exchanged.

In the case of a manual exchange, an operator can advantageously perform an additional visual check.

According to a further advantageous embodiment of the invention, it is provided that a switch is provided to trigger a changing process for manual replacement of the probe head or the sensor or the articulating head/unit. This switch serves as safety purpose for manual changes. It is a kind of an "enabling switch" that triggers the manual change of the probe head or the sensor or the articulating head/unit.

According to an advantageous embodiment of the invention, it is provided that the fastening device, preferably the interface, does not have to be energized with energy during operation. For example, the fastening device can be designed as a hook that uses a compression spring to hold the probe head or the sensor or the articulating head/unit securely in one position without the need for an additional supply of energy or, for example, air during the measurement process.

The removal of the probe head or the sensor or the articulating head/unit from the interface is advantageously triggered by a software command. In the case of a manual change—as already described—it is advantageously necessary to operate a switch. Energy is then supplied to the system, for example pressure is applied to the compression spring, so that the hook opens and the sensor or the probe head or the articulating head/unit is released from the interface.

According to a further embodiment of the invention, it is provided that the fastening device of the interface has to be supplied with energy during operation. This embodiment has the advantage that the fastening device can be released by switching off the energy supply.

According to a further advantageous embodiment of the invention, it is provided that at least one centering pin is provided on the ram or on the interface or the probe head or the sensor or the articulating head/unit. At least two centering pins are preferably provided.

The centering pin makes it possible to pre-center the probe head or the sensor or the articulating head/unit when inserting it into the interface or on the ram.

If asymmetrically positioned centering pins are provided, the probe head or the sensor or the articulating head/unit is unable to be twisted in the interface, i.e. inserted incorrectly.

As already stated, the fastening device for the probe head or the sensor or the articulating head/unit is positioned in the interface or in the ram, that is to say positioned at a distance in the axial direction of the ram from the probe head side at the end of the ram. In principle, it is also possible to position the interfaces for air, electronics, hydraulics, or optical connections in this plane, for example.

The probe head-side end of the ram means the end in which the probe head or the sensor or the articulating head/unit or the interface is at least partially positioned.

When inserting the sensor or the probe head or the adapter for the articulating head/unit in the interface or in the ram, the end position of the sensor, the probe head, or the adapter of the articulating head/unit is automatically recognized so that the probe head, the sensor, or the articulating head/unit can be fixed in the interface or in the ram.

As already stated, probe heads can be designed as tactile probe heads. Measuring type probe heads can also be provided.

The sensors can be, for example, optical point sensors, cameras for image processing, roughness sensors, triangulation sensors, or Barkhausen sensors, etc.

These probe heads or sensors are exchanged depending on the needs of the measurement task. Articulating head/units can also be provided.

If the probe heads or sensors or the articulating head/units are changed automatically, measurement inaccuracies are reduced and the measuring time for combined measurements (optical/tactile) is also reduced.

According to a further advantageous embodiment of the invention, it is provided that an optical status display is positioned at least in segments on the interface or on the probe head or on the sensor or on the articulating head/unit.

The optical status display is advantageously designed as a lamp, light guide, and/or light ring. According to a preferred embodiment, the optical status display has at least one LED.

The optical status display is advantageously positioned at the far end of fixation of the interface, the probe head, or the sensor, or the articulating head/unit.

For example, the optical status display can be used to indicate the complete and proper placement of the probe head or sensor or adapter for the articulating head/unit on the interface or in the ram or the functionality of the interface, the probe head, or the sensor or the articulating head/unit or the status/progress of the measurement.

According to a further advantageous embodiment of the invention, it is provided that a protective device in and/or on the interface for the probe head or the sensor or the articulating head/unit is provided.

According to a further advantageous embodiment of the invention, it is provided that a protective device in and/or on the ram for the interface or the probe head or the sensor or the articulating head/unit is provided.

This protective device is provided to protect the interface positioned at least partially in the ram or the probe head positioned at least partially in the ram or the sensor positioned at least partially in the ram or the articulating head/unit positioned at least partially in the ram from damage caused by collision with an inner surface of the ram during changing.

A protective device is particularly advantageously provided in and/or on the interface, which protects the exchangeable probe head or the exchangeable sensor or the exchangeable articulating head/unit from damage caused by collision with an inner surface of the interface.

The protective device is advantageously made of a material that has a low level of surface roughness. This allows the probe head or sensor or articulating head/unit to slide along the guard without damage if contact should occur.

The protective device is advantageously formed from a plastic. Plastic has a low surface roughness. Plastic has a lower hardness than metal, so that the housing of the probe head or the sensor or the interface, usually made of metal, is not damaged when it touches the protective device.

The interface is advantageously designed as a universal probe head or sensor interface or articulating head/unit interface, consisting of a mechanical, electronic, optical, pneumatic, and/or hydraulic coupling between interface and probe head or interface and sensor or interface and articulating head/unit.

BRIEF DESCRIPTION OF THE DRAWINGS

Further features and advantages of the invention result from the associated drawings, in which various embodiments of a coordinate measuring machine according to the invention are shown only as examples, without restricting the invention to these exemplary embodiments. The drawings show.

DETAILED DESCRIPTION OF THE DRAWINGS

Figure 1:
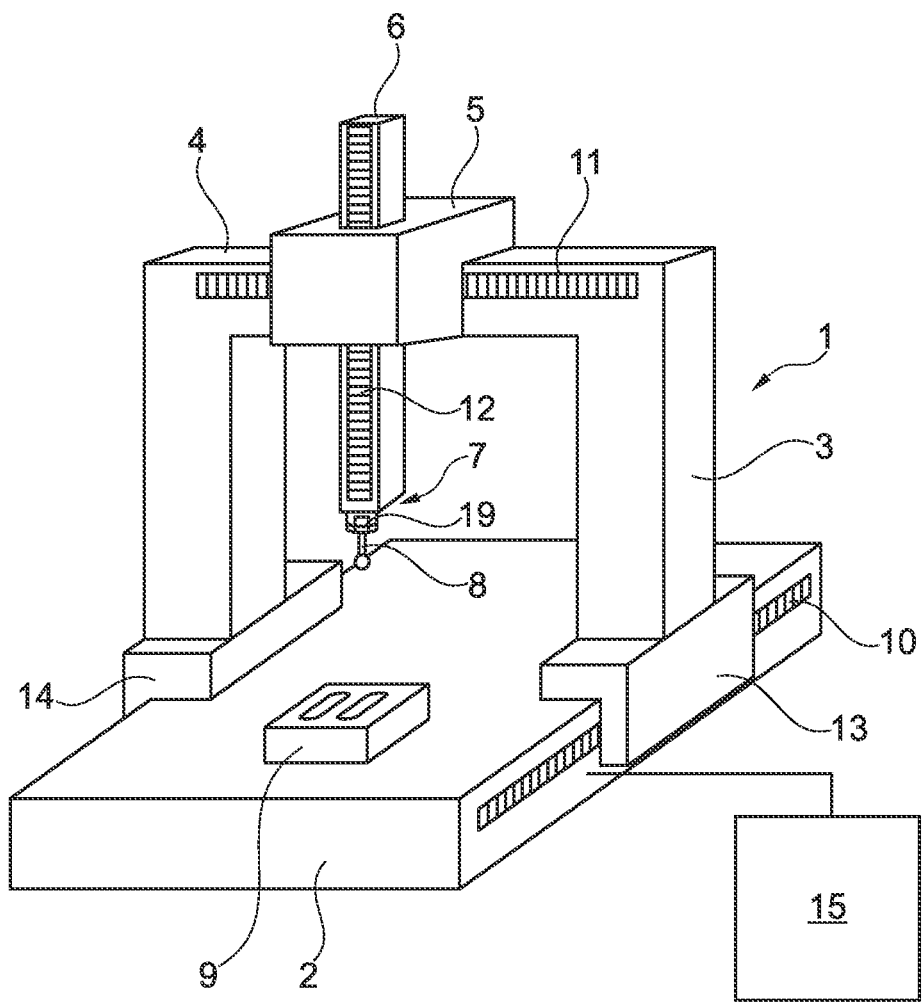
FIG. 1 a perspective view of a coordinate measuring machine in a portal design.

FIG. 1 shows a coordinate measuring machine 1 in portal design with a tool table 2 and a portal 3. The portal 3 has a traverse 4. A carriage 5 is positioned on the traverse 4, on which in turn a ram 6 is positioned. The portal 3 can be moved in the X direction, the carriage 5 in the Y direction, and the ram 6 in the Z direction. A probe head 7 holding a stylus 8 is positioned on the ram 6. A workpiece 9 is positioned on the measuring table 2 of the coordinate measuring machine.

One scale 10 is positioned on the measuring table 2, one scale 11 on the traverse 4, and one scale 12 on the ram 6. The position of the stylus 8 can be detected by means of corresponding distance measuring systems (not shown). The portal 3 has portal feet 13, 14, with which the portal 3 is movably positioned on the measuring table 2. The measured values are recorded and processed via a computer 15, which also contains a control unit.

In principle, there is also the possibility that the portal 3 is fixed in its position and the tool table with the workpiece is moved relative to the portal.

In addition, it is also known to position a rotary table on the tool table 2, for example.

Figure 2:
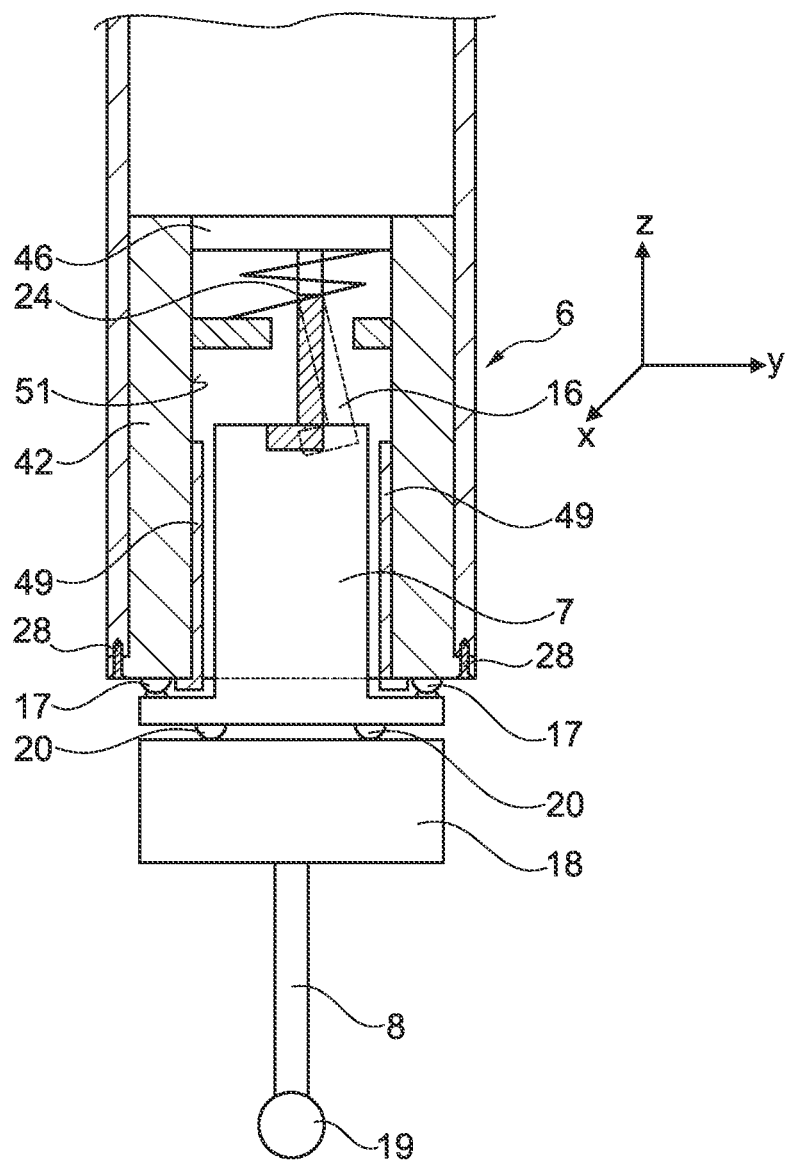
FIG. 2 a partial longitudinal section of a ram with interface, probe head, and stylus holder.

FIG. 2 shows a schematic of the ram 6. An interface 42 and the probe head 7 are positioned in the ram 6. The probe head 7 is fixed in the ram 6 by means of a three-point bearing 17 by means of a hook 16 that can be swiveled in the Y direction and moved in the Z direction. A stylus holder 18 is positioned on the probe head 7 and carries the stylus 8 with a probing element 19. The stylus holder 18 is also detachably attached to the probe head 7 by means of a three-point bearing 20. The holding means for holding the stylus holder 18 are not shown in FIG. 2.

An interface 42 is provided only in schematic form in FIG. 2. The interface 42 has a holding device 46 for the hook 16. The three-point bearing 17 is also positioned on the interface 42.

The interface 42 is positioned inside the ram 6. The interface 42 is positioned on the ram 6 with screws 28. The interface 42 can be removed from the ram 6 by undoing the screws 28.

A protective device 49 is provided so that the probe head 7 is not damaged during exchange if it comes into contact with an inner wall of the interface 42. The protective device 49 is made of plastic, for example. The protective device 49 is areally formed (as a surface) in FIG. 2. In the exemplary embodiment, the protective device 49 is positioned as a segment on an inner surface 51 of the interface 42. The protective device 49 can also have a greater axial extension in the direction of a longitudinal axis of the ram 6 than shown in FIG. 2. It can be designed in segments with at least one segment or continuously.

Figure 3:
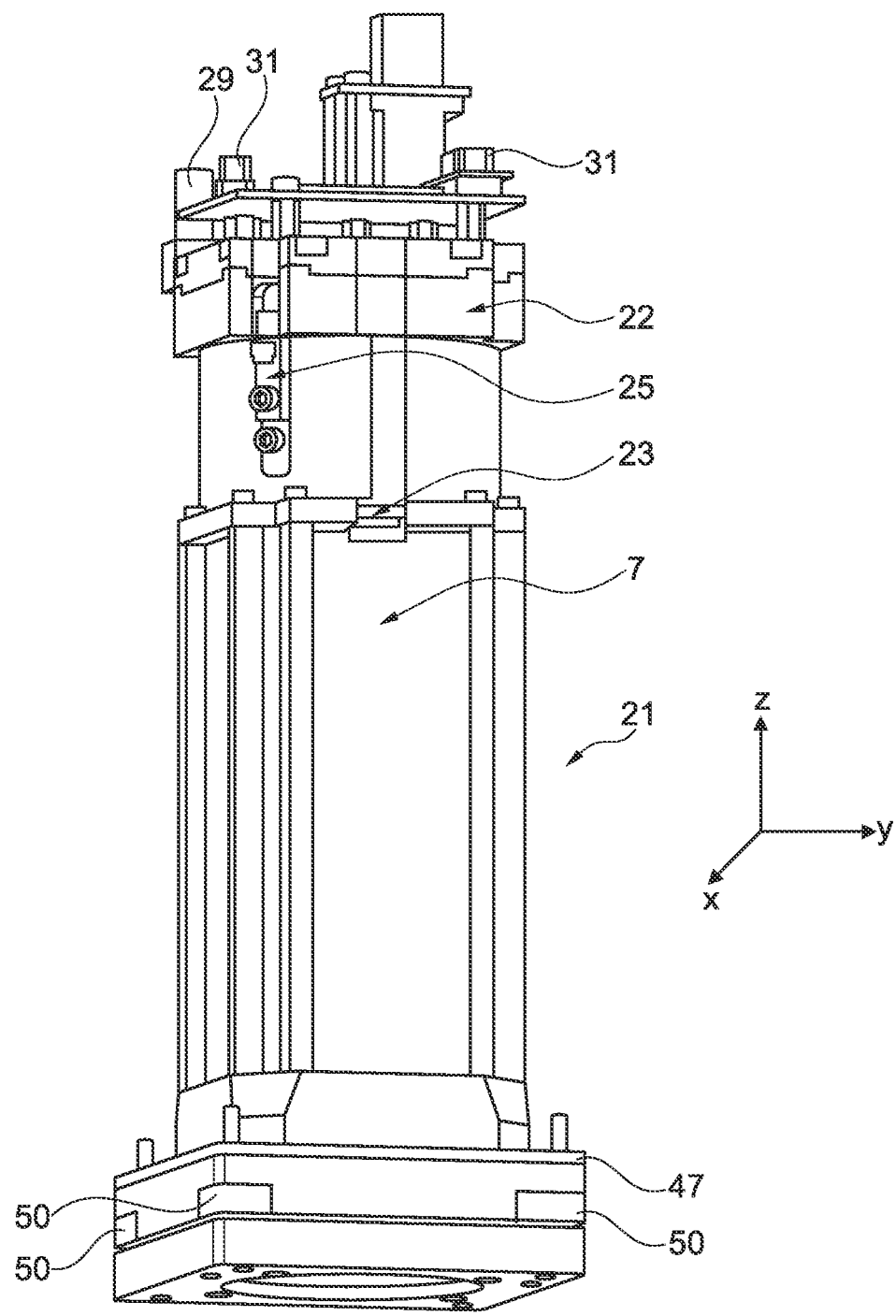
FIG. 3 a perspective view of a sensor/probe head/articulating head/unit holder in a ram without ram housing.

FIG. 3 shows a probe head holding device 21, which is positioned in the ram 8 (not shown in FIG. 3). The probe head holding device 21 has a clamping unit 22. The clamping unit 22 includes the hook 16 (shown in FIG. 2). A sensor 23 detects whether the probe head 7 is inserted into the probe head holding device 21. The sensor 23 can be designed as a light barrier. When the sensor 23 is triggered, the hook 16 is pushed up in the Z-axis direction by means of a compression spring 24 (shown in FIG. 2). The compression spring 24 ensures that no further external energy has to be supplied while the probe head 7 is being fixed in the ram 6 and that the probe head 7 remains fixed. To release the probe head 7, compressed air is introduced into the system so that the hook 16 is moved in the negative Z-direction in the direction of the three-point mount 17 and can then be swiveled into the dashed position in FIG. 2 so that the probe head 7 can be exchanged.

According to FIG. 3, further sensors 25 are provided for detecting a piston position.

In addition, a device 23 is provided that detects whether a probe head 7 or a sensor is inserted. The device 23 can be designed as a light barrier.

The probe head 7 has a light guide 47. This light guide 47 is formed as a light strip made of LEDs.

In addition, the probe head has 7 cover caps 50. A mechanical connecting element (for example a clamp or a screw connection) (not shown) is positioned under each of the cover caps 50. By undoing this mechanism, the entire probe head holding device 21 shown in FIG. 3 can be removed from the ram 6 with a probe head or a sensor or an adapter for an articulating head/unit. This is an emergency release if the hook 16 (not shown in FIG. 3) does not release the probe head 7 or the sensor or the adapter for the articulating head/unit due to a fault.

Figure 4:
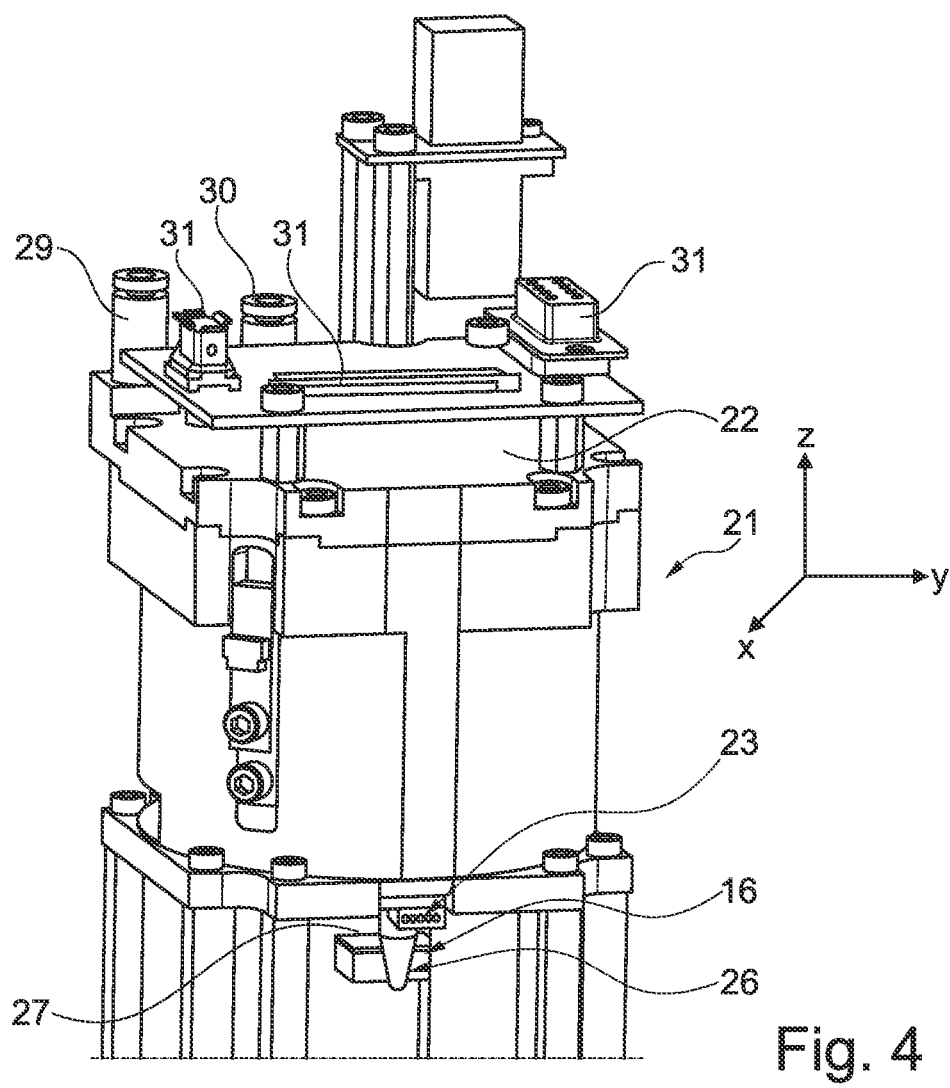
FIG. 4 a partial view of FIG. 3 with hooks and centering pins.

FIG. 4 shows the upper part of the probe head holding device 21. The hook 16 is shown in FIG. 4. In addition, centering pins 26, 27 are provided and a sensor 23 that detects whether a probe head 7 is inserted in the probe head holding device 21.

Furthermore, two compressed air connections 29, 30 are provided. The compressed air connection 30 is provided in order to enable the hook 16 to be released.

In addition, electrical connections 31 are provided for supplying power to sensors, forwarding data from the probe head, from the sensor or interface, etc.

Figure 5:
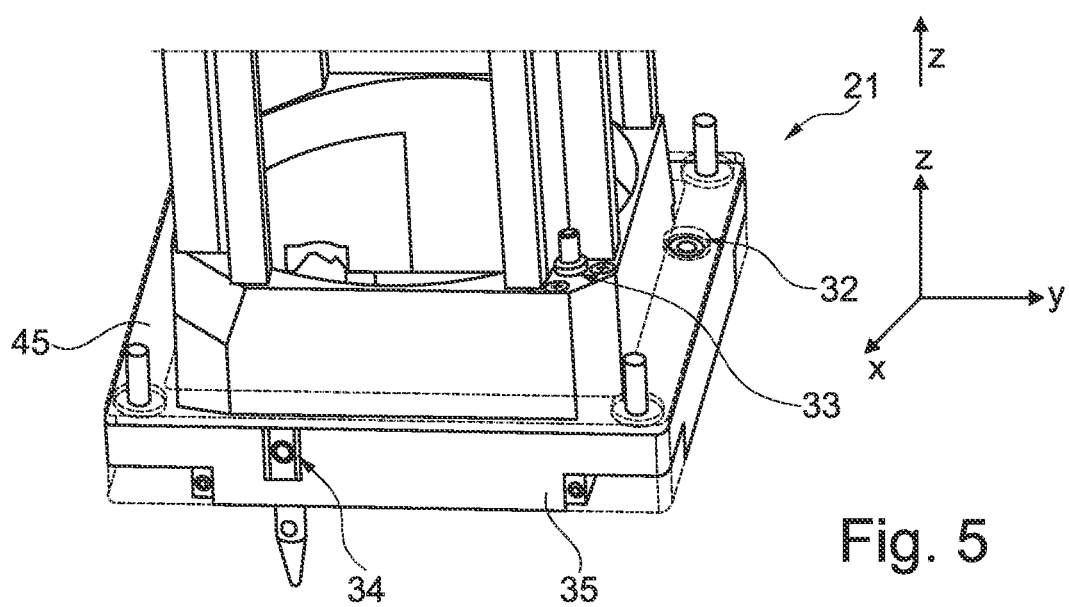
FIG. 5 another partial view of FIG. 3.

FIG. 5 shows the lower part of the probe head holding device 21. The lower part has an air connection 32 for external sensors. In addition, an optical connection 33 is provided, as is an enabling switch 34. The probe head holding device 21 has a plane 35 with a three-point mount. The optical connector 33 is shifted in the Z-direction in the axial direction in the direction of the fastening device with the hook 16 with respect to the plane 35 with the three-point mount.

In FIGS. 3, 4, and 5, the housing of the ram 6 is not shown. However, the housing 6 extends to the plane 35 of the three-point bearing.

Figure 6:
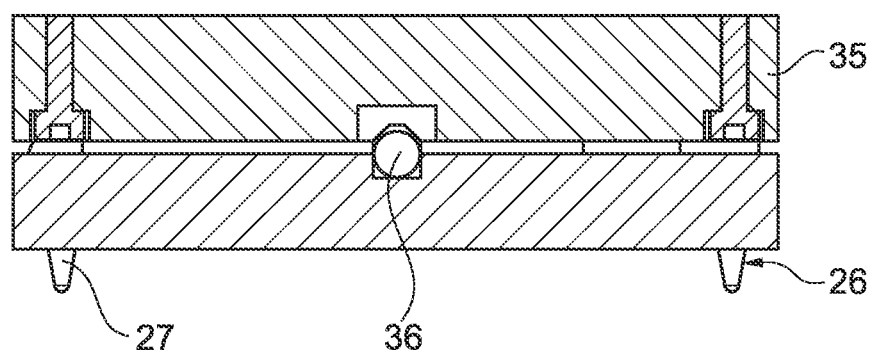
FIG. 6 a longitudinal section of a three-point bearing.

The plane 35 with the three-point bearing is shown in FIG. 6 in detail. The three-point bearing consists of three balls or ball sections 36. In addition, the centering pins 26, 27 are present, which on the one hand pre-center the probe head 7 when it is inserted and on the other hand prevent incorrect, i.e. twisted, insertion of the probe head 7 if the centering pins 26, 27 are configured asymmetrically.

Figure 7:
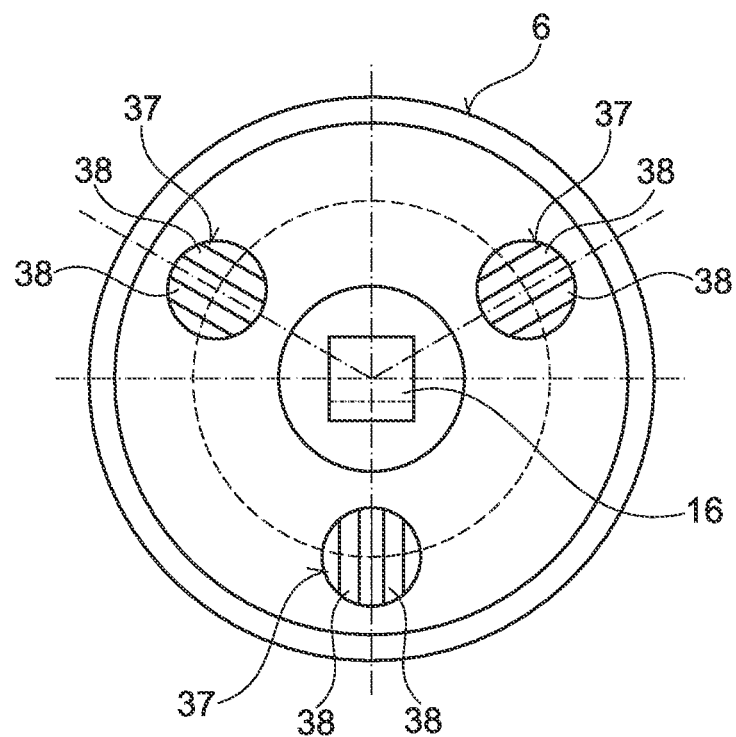
FIG. 7 a top view of a three-point bearing.

FIG. 7 shows a plan view of the three-point bearing. The ram 6 with the three bearings 37 is shown in FIG. 7. The bearings 37 each have two cylinders 38. In addition, the hook 16 is provided.

Figure 8:
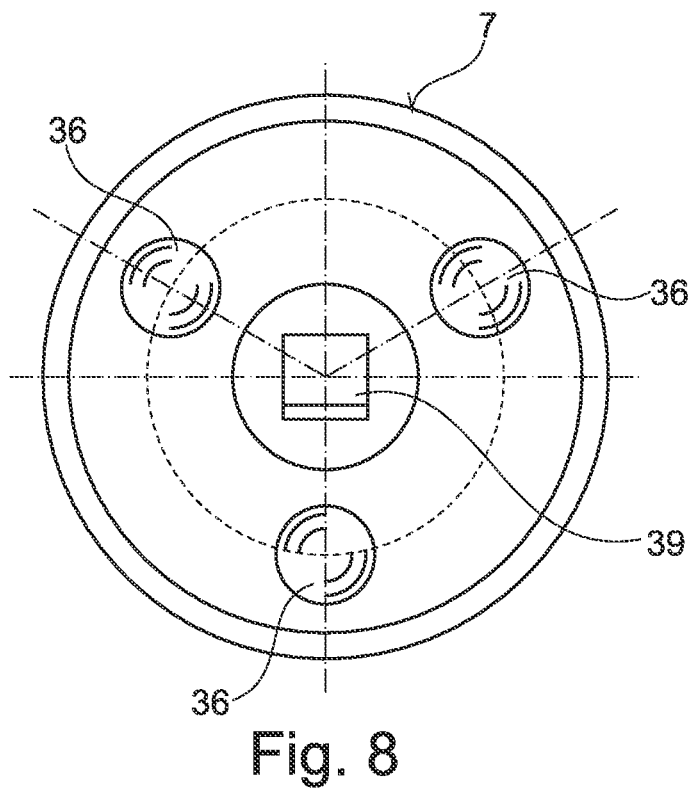
FIG. 8 a top view of a counterpart to the three-point bearing of FIG. 7.

FIG. 8 shows the probe head 7, in which three half spheres 36 are positioned. When the probe head 7 is positioned on the ram 6, the half spheres 36 come into contact with the cylinders 38 at a total of six points. This achieves reproducible and high-precision bearings. The probe head 7 has a receptacle 39 for the hook 16.

Figure 9:
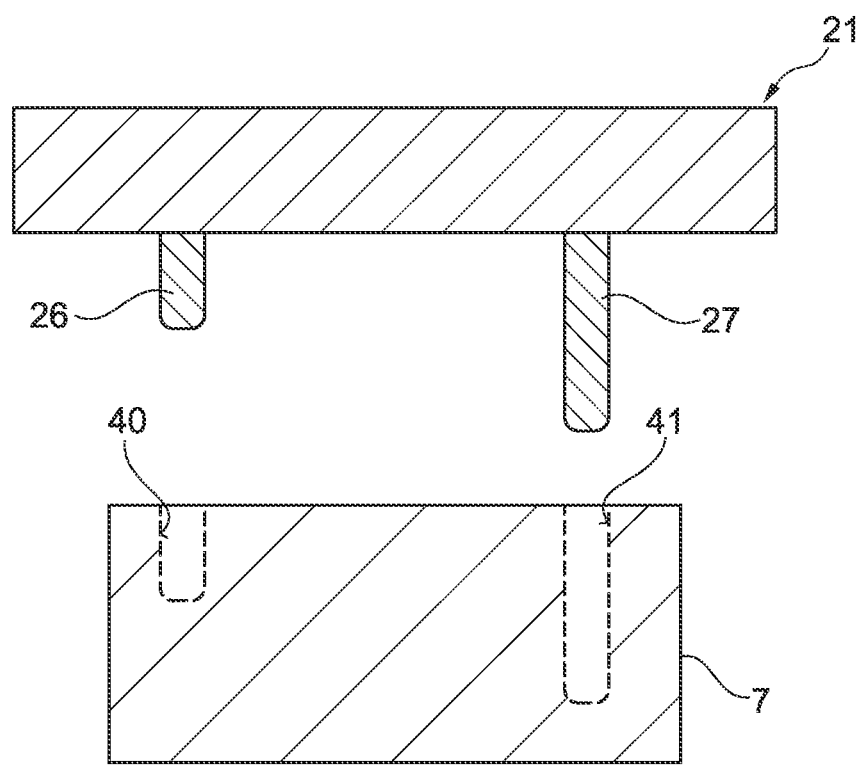
FIG. 9 a longitudinal section of devices with centering pins.

FIG. 9 shows the lower part of the probe head holding device 21 with the centering pins 26, 27. The centering pins engage in receptacles 40, 41 of the probe head 7. The centering pins 26, 27 are different lengths. For this reason, the centering pin 27 can only be inserted into the receptacle 41. As a result, it is not possible to rotate the probe head 7 by 180°.

In FIGS. 1 through 9, the invention was shown with an interface 42 and a probe head 7 positioned in the ram 6. According to FIG. 10, the interface 42 is positioned detachably fixed in and on the ram. Screws 28 (not shown in FIG. 10), for example, can be provided for the detachable fixed connection. According to FIG. 10, the probe head 7 is positioned on the interface 42 so that it can be exchanged reproducibly. For this purpose, the interface 42 has a three-point bearing 43. The probe head 7 in turn has a three-point bearing 44 for the stylus holder 18, which holds the ram 8 and the probing element 19.

Instead of the probe head 7, a sensor (not shown) can also be provided. This can be, for example, an optical sensor, an optical probe head, or a roughness sensor or similar.

The level 35 of the three-point mount is positioned on the probe head-side end 45 of the ram 6 (FIG. 5).

Figure 10:
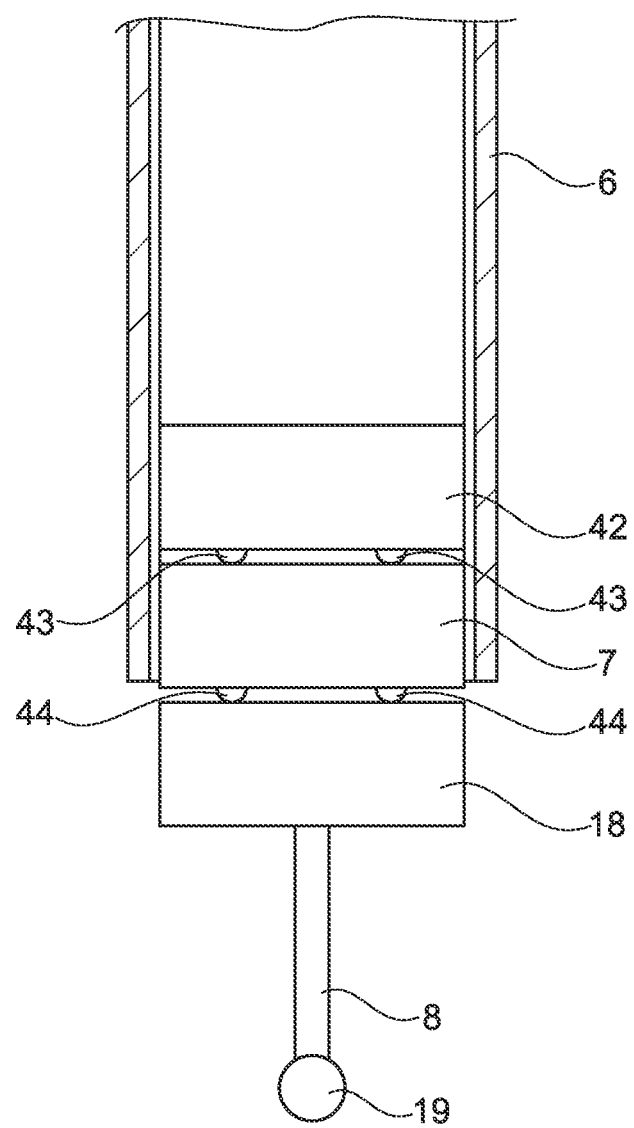
FIG. 10 a longitudinal section through a ram with interface and probe head and stylus holder.
Figure 11:
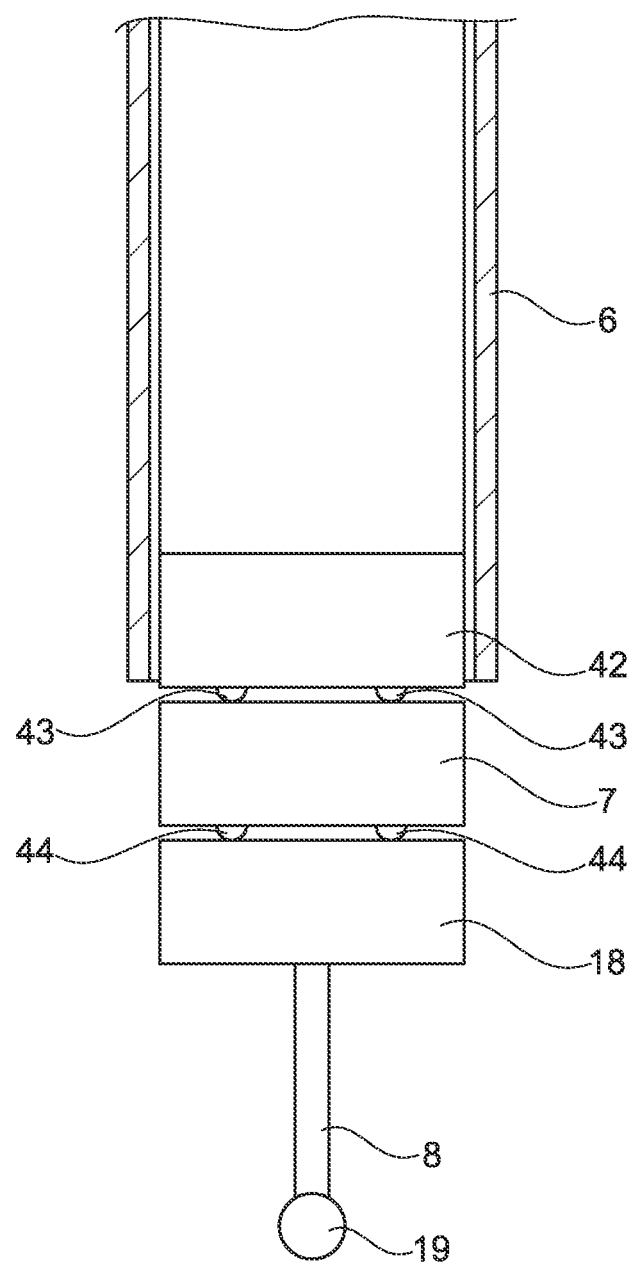
FIG. 11 a longitudinal section of a modified embodiment of a ram with interface and probe head and stylus holder.

FIG. 11 shows the exemplary embodiment according to FIG. 10 in a modified embodiment. Identical parts are provided with the same reference numbers.

According to FIG. 11, the interface 42 is positioned in the ram 6. The probe head 7 and the stylus holder 18 are positioned outside of the ram 6.

Figure 12:
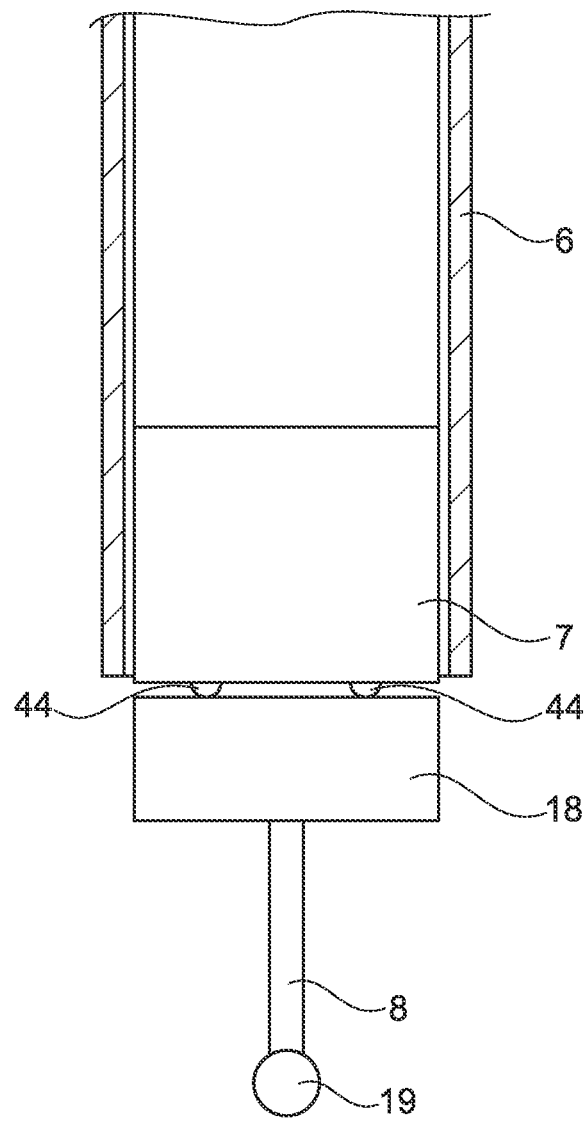
FIG. 12 a longitudinal section of a modified embodiment of a ram with probe head and stylus holder.

FIG. 12 shows a further embodiment. According to FIG. 12, only one probe head 7 is provided, which is positioned in the ram 6.

The probe head 7 has a three-point bearing 44 for the stylus holder 18. The stylus 8 with the probing element 19 is positioned on the stylus holder 18. According to FIG. 12, no interface is provided.

Figure 13:
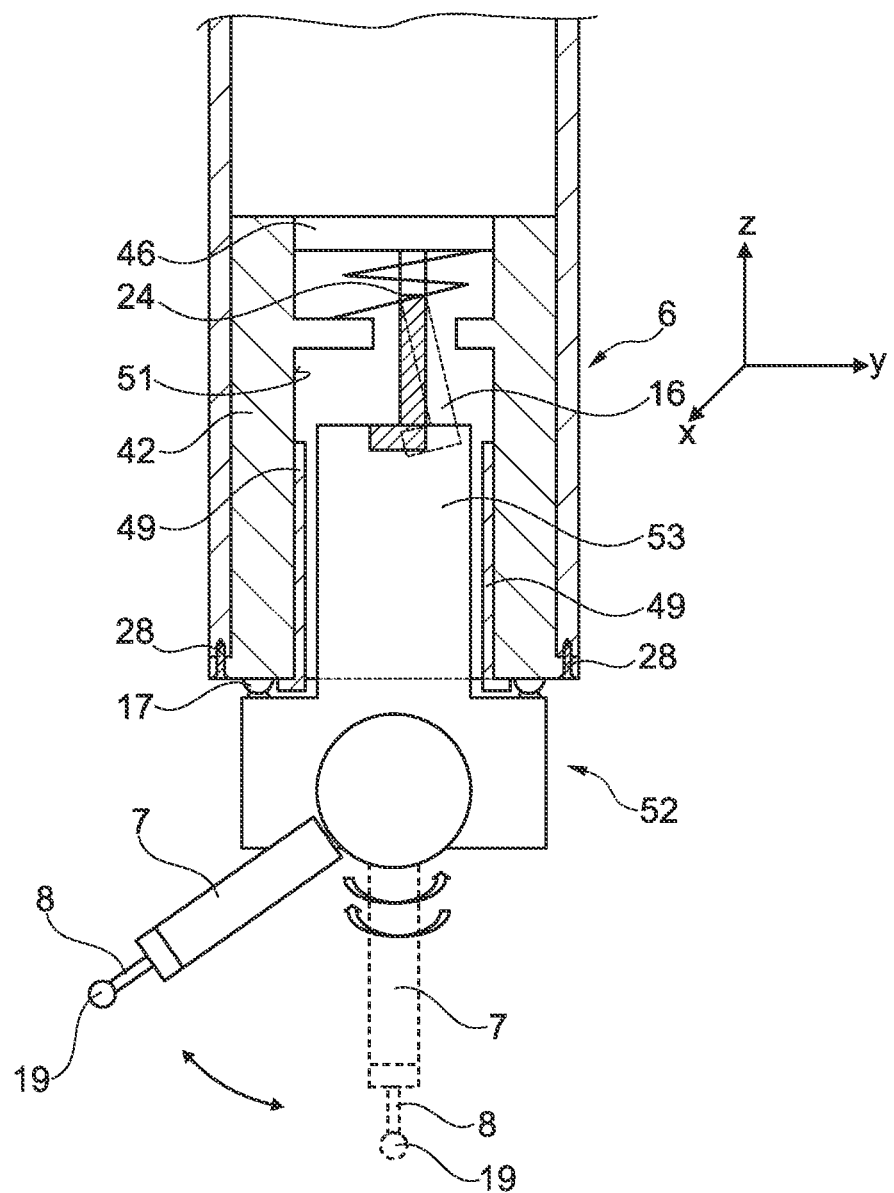
FIG. 13 a longitudinal section of a modified embodiment of a ram with articulating head/unit with probe head.

FIG. 13 shows the ram 6 with the interface 42 positioned in the ram 6. An adapter 53 for a articulating head/unit 52 is positioned in the interface 42. Instead of the probe head 7, as shown in FIG. 2, the adapter 53 for the articulating head/unit 52 is positioned in the interface 42. A probe head 7 is provided on the articulating head/unit 52, on which a stylus 8 with a stylus ball 19 can be positioned so that it can be exchanged. The stylus 8 can be pivoted into the position shown in dashed lines.

The adapter 53 for the articulating head/unit 52 is positioned reproducibly in the interface 42 by means of the hook 16 and a three-point bearing 17. The protective device 49 protects the adapter 53 from damage when it is exchanged.

The interface 42 is positioned inside the ram 6. The interface 42 is positioned on the ram 6 with screws 28. The interface 42 can be removed from the ram 6 by undoing the screws 28.

Figure 14:
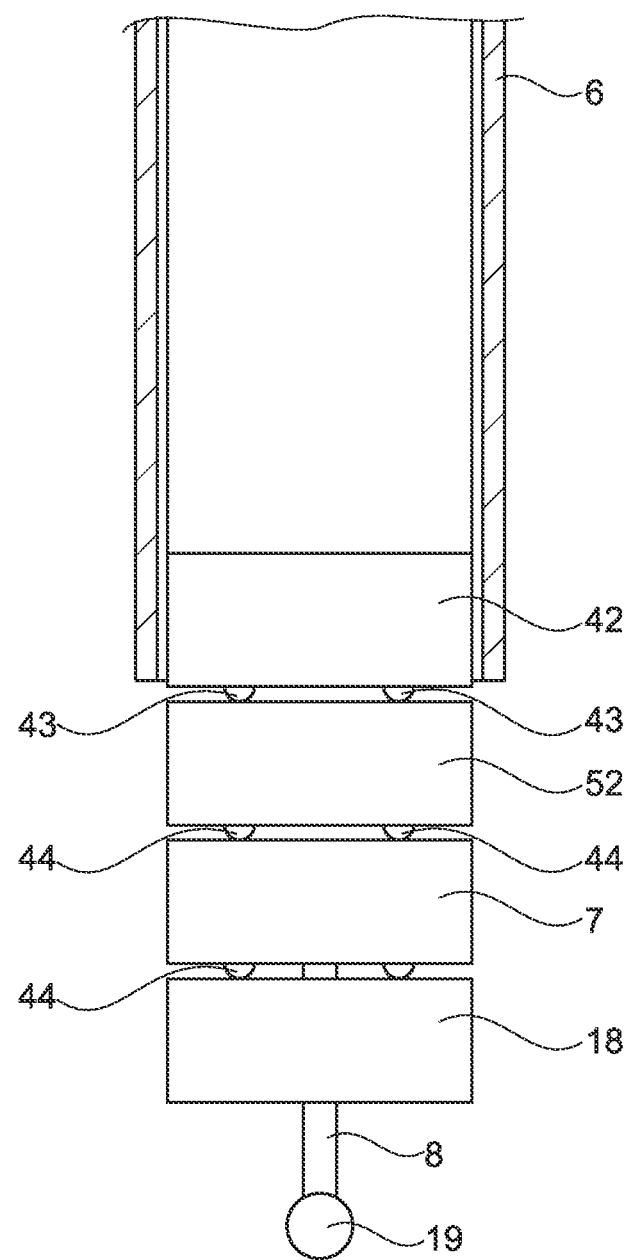
FIG. 14 a longitudinal section of a modified embodiment of a ram with articulating head/unit, probe head, and stylus holder.

FIG. 14 shows the ram 6 in which the interface 42 is positioned. The articulating head/unit 52 is positioned on the ram 6. The probe head 7 that holds the stylus holder 18 is in turn positioned on the articulating head/unit 52. The stylus 8 with the stylus ball 19 is positioned on the stylus holder 18. A three-point bearing 44 is provided between the interface 42, the articulating head/unit 52, the probe head 7, and the stylus holder 18 in each case.

The interface 42 is positioned on the ram 6 with screws 28 (not shown), as shown in FIG. 2. The interface 42 can be removed from the ram 6 by undoing the screws 28.

REFERENCE NUMBERS 1 coordinate measuring machine
2 tool table
3 portal
4 traverse
5 carriage
6 ram
7 probe head
8 stylus
9 workpiece
10 scale
11 scale
12 scale
13 portal foot
14 portal foot
15 computer
16 hook
17 three-point bearing
18 stylus holder
19 probing element/stylus ball
20 three-point bearing
21 probe head holder
22 clamping unit
23 sensor
24 compression springs
25 sensors
26 centering pin
27 centering pin
28 screws
29 compressed air connection
30 compressed air connection
31 electrical connection
32 air connection for external sensors
33 optical connection
34 enabling switch
35 plane of the three-point mount
36 ball sections
37 bearing
38 cylinder
39 receptacle
40 centering pin receptacle
41 centering pin receptacle
42 interface
43 three-point bearing
44 three-point bearing
45 probe head-side end
46 holding device
47 light guide (LED)
49 safety device
50 cover caps
51 inner surface interface
52 articulating head/unit
53 articulating head/unit adapter

The invention claimed is:

1. A coordinate measuring machine, comprising:
    a ram, configured as a fixed portion, comprising:
        an interface, coupled to an interior of the ram, configured to retain a replaceable portion comprising one of a probe head, a sensor, or an articulated head unit,
        wherein the replaceable portion is reproducibly mounted by means of a three-point bearing, wherein one or more of the probe head, the sensor, and the articulated head unit are arranged at least partially within the ram, wherein the probe head, the sensor, and the articulated head unit are configured to be interchangeable on the interface.

2. The coordinate measuring machine according to claim 1, wherein one or more of the probe head, the sensor, or the interface are disposed completely within the ram.

3. The coordinate measuring machine according to claim 1, wherein the three-point bearing is disposed at a probe end, a sensor end, or an articulated head unit end of the ram.

4. The coordinate measuring machine according to claim 3, wherein the three-point bearing is disposed on the probe end, the sensor end, or the articulated head unit end of the ram and outside the ram.

5. The coordinate measuring machine according to claim 1, wherein a fastening device for releasably fastening the probe head or the sensor is disposed in the ram at the end of the probe head, the sensor, or the articulated head unit, remote from the three-point bearing.

6. The coordinate measuring device according to claim 5, wherein the fastening device is configured as a hook.

7. The coordinate measuring machine according to claim 5, comprising at least one sensor configured to monitor a closed state of the fastening device.

8. The coordinate measuring machine according to claim 1, wherein a light barrier is configured to detect an end position of the replaceable portion in response to the replaceable portion is replaced.

9. The coordinate measuring machine according to claim 1, wherein at least one air supply connection for one or more of the probe head, the sensor, or the interface is disposed in a plane of the three-point bearing.

10. The coordinate measuring machine according to claim 9, wherein an optical interface is displaced from the plane of the three-point bearing in an axial direction of the ram in a direction of the fastening device.

11. The coordinate measuring device according to claim 1, wherein one or more of the probe head or the sensor is configured to be one of automatically or manually exchangeable.

12. The coordinate measuring machine according to claim 11, wherein a switch for enabling a changing process for the replaceable portion is provided for manual changing one or more of the probe head, the sensor, and the articulated head unit.

13. The coordinate measuring machine according to claim 1, wherein at least one centering pin is provided on one or more of the interface, the probe head, and the sensor.

14. The coordinate measuring machine according to claim 1, wherein an emergency release is configured to release the probe head, the sensor, or the articulating head/unit from the interface.

15. The coordinate measuring machine according to claim 1, wherein the replaceable portion comprises an optical status display, wherein the optical status display indicates complete and proper placement of the replaceable portion to the interface.

16. The coordinate measuring machine according to claim 15, wherein the optical status display is one of a lamp, a light guide, or a light ring and comprises at least one light emitting diode (LED).

17. The coordinate measuring machine according to claim 15, wherein the optical status display is disposed at a far end of fixation of the replaceable portion.

18. The coordinate measuring machine according to claim 1, wherein the ram comprises a protective device configured to protect the replaceable portion from damage caused by a collision with an inner surface of the ram while replacing the replaceable portion.

19. The coordinate measuring machine according to claim 18, wherein the protective device is formed from a plastic material having a low external surface roughness.

20. The coordinate measuring machine according to claim 18, wherein the protective device is positioned in or on the interface.

* * * * *